United States Patent
Takanashi (10) Patent No.: US 9,025,036 B2
(45) Date of Patent: May 5, 2015

(54) FOCUS ADJUSTMENT APPARATUS AND METHOD FOR CONTROLLING THE SAME

(71) Applicant: Canon Kabushiki Kaisha, Tokyo (JP)

(72) Inventor: Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 13/648,360

(22) Filed: Oct. 10, 2012

(65) Prior Publication Data

US 2013/0093939 A1    Apr. 18, 2013

(30) Foreign Application Priority Data

Oct. 14, 2011   (JP) .................................. 2011-226993
Jul. 12, 2012   (JP) .................................. 2012-156628

(51) Int. Cl.

| H04N 5/228 | (2006.01) |
|---|---|
| H04N 5/235 | (2006.01) |
| H04N 7/18 | (2006.01) |
| H04N 5/225 | (2006.01) |
| H04N 5/232 | (2006.01) |
| G03B 13/36 | (2006.01) |
| G02B 7/36 | (2006.01) |
| G03B 17/14 | (2006.01) |

(52) U.S. Cl.
CPC ............ *H04N 5/23212* (2013.01); *G03B 13/36* (2013.01); *G02B 7/36* (2013.01); *H04N 5/23219* (2013.01); *G03B 17/14* (2013.01); *G03B 2206/00* (2013.01)

(58) Field of Classification Search
None
See application file for complete search history.

(56) References Cited

U.S. PATENT DOCUMENTS

| 2008/0204565 A1* | 8/2008 | Yumiki ..................... 348/208.99 |
| 2009/0303378 A1* | 12/2009 | Yoshimatsu et al. .......... 348/348 |
| 2010/0208127 A1* | 8/2010 | Takada et al. ................. 348/349 |
| 2011/0012991 A1* | 1/2011 | Watanabe et al. ............... 348/43 |

FOREIGN PATENT DOCUMENTS

| CN | 101241296 A | 8/2008 |
| JP | 2001-318304 A | 11/2001 |
| JP | 3442426 B2 | 9/2003 |
| JP | 2007-052072 A | 3/2007 |
| JP | 2010-186004 A | 8/2010 |

* cited by examiner

*Primary Examiner* — Lin Ye
*Assistant Examiner* — Euel Cowan
(74) *Attorney, Agent, or Firm* — Canon USA Inc IP Division (57) ABSTRACT

A focus adjustment apparatus includes an object detection unit configured to detect feature information of an object, a plurality of signal generation units configured to accumulate charges to generate and output a pair of image signals respectively, and a focus detection unit configured to control charge storage of the plurality of signal generation units and detect a focus based on a phase difference between a pair of image signals output from a first signal generation unit corresponding to the feature information of the object detected by the object detection unit, wherein if reliability of detection by the object detection unit is a first level which is higher than a second level, the focus detection unit sets charge storage time of the first signal generation unit longer than that in a case of the second level.

16 Claims, 11 Drawing Sheets

FIG.4A
AF PROCESSING UNIT

FOCUS ADJUSTMENT APPARATUS AND METHOD FOR CONTROLLING THE SAME

BACKGROUND OF THE INVENTION

1. Field of the Invention

The present invention relates to a focus adjustment apparatus that performs autofocus (AF) control by performing tracking according to feature information of an object.

2. Description of the Related Art

There has conventionally been discussed a technique for detecting feature information such as a face or a color and executing focusing control based on a range-finding result of a phase difference autofocus (AF) sensor corresponding to a position of the feature information. Japanese Patent Application Laid-Open No. 2010-186004 discuses a technique for performing focus adjustment by phase difference AF by tracking a face area.

Japanese Patent No. 3442426 discusses a technique for storing in advance a relationship between an output of a photometric sensor and an output of an AF sensor as a setting value, and adjusting charge storage time of the AF sensor based on high and low of luminance.

However, because of a principle of the phase difference AF and the face/color detection, features of an object each suited for detection are incompatible to each other. More specifically, for the phase difference AF, high focusing accuracy is acquired in the case of an object having contrast. On the other hand, for the face/color detection, detection of an object is easier in an area having a uniform color such as a skin color for which the phase difference AF is not suited. These opposing features cause an issue that sufficient focusing accuracy cannot be acquired if focusing control is executed in a position where a face or a color has been detected. In the technique discussed in Japanese Patent No. 3442426, the charge storage time of the AF sensor is changed based on the luminance information of the object. In consequence, an issue, namely, reduction in accuracy of the phase difference AF caused by low contrast when AF is executed by using the feature information such as a face or a color, cannot be avoided.

SUMMARY OF THE INVENTION

An example of the present invention is directed to improvement of phase difference autofocus performance in a tracked area while maintaining tracking accuracy using feature information such as a face or a color.

According to an aspect of the present invention, a focus adjustment apparatus includes an object detection unit configured to detect feature information of an object, a plurality of signal generation units configured to accumulate charges to generate and output a pair of image signals respectively, and a focus detection unit configured to control charge storage of the plurality of signal generation units and detect a focus based on a phase difference between a pair of image signals output from a first signal generation unit corresponding to the feature information of the object detected by the object detection unit, wherein if reliability of detection by the object detection unit is a first level which is higher than a second level, the focus detection unit sets charge storage time of the first signal generation unit longer than that in a case of the second level.

According to another aspect of the present invention, a method for controlling a focus adjustment apparatus including a plurality of signal generation units configured to accumulate charges to generate and output a pair of image signals respectively includes detecting feature information of an object, and controlling charge storage of the plurality of signal generation units and detecting a focus based on a phase difference between a pair of image signals output from a first signal generation unit corresponding to the detected feature information of the object, wherein if reliability of detection of the feature information of the object is a first level which is higher than a second level, charge storage time of the first signal generation unit is set longer than that in a case of the second level.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
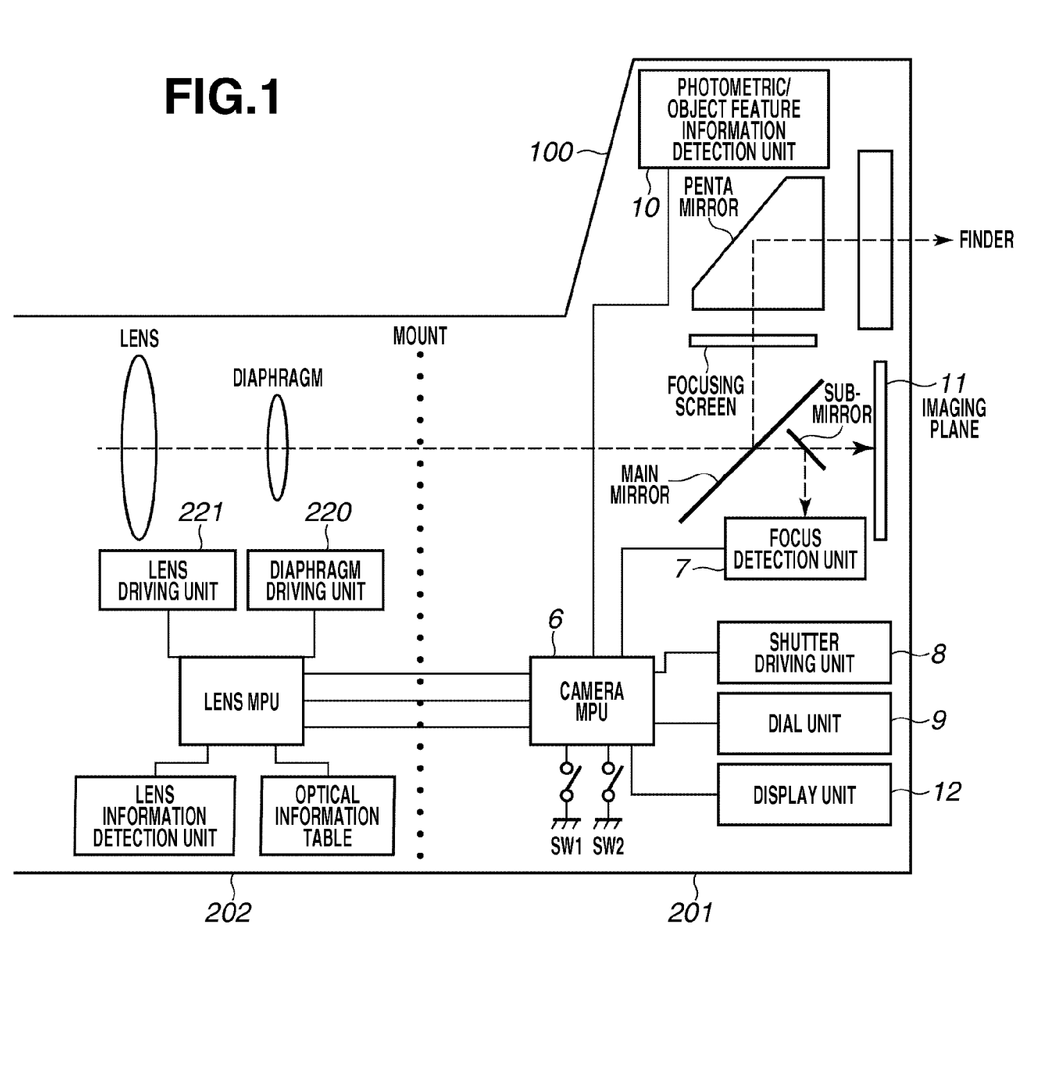
FIG. 1 illustrates a configuration of a camera according to a first exemplary embodiment.
Figure 2:
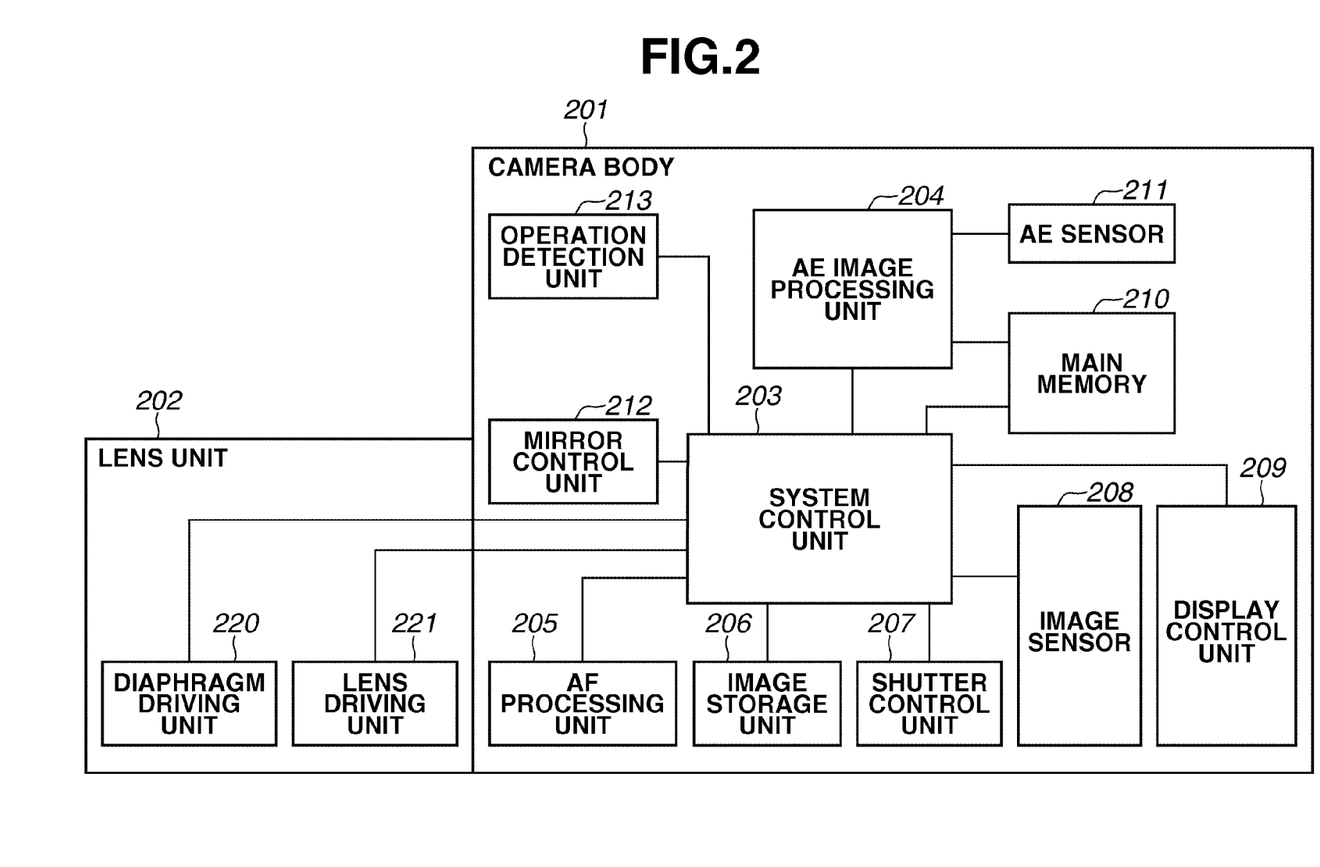
FIG. 2 is a block diagram illustrating a camera function according to the first exemplary embodiment.

FIG. 1 is a block diagram illustrating a configuration example of a digital camera (hereinbelow, simply referred to as "camera") 100 as an example of an imaging apparatus according to the present invention. FIG. 2 is a configuration diagram illustrates a camera function according to an example of the present invention. A lens unit 202 is detachably attached to a camera body 201 via a mount. In the present exemplary embodiment, the lens unit is not described in detail. A lens micro processing unit (MPU) in the lens unit 202 controls driving of a lens driving unit 221, a diaphragm control unit 220, and so on based on an instruction from a camera MPU 6.

The camera MPU 6 includes a read-only memory (ROM) that stores a program for controlling a camera operation, a random access memory (RAM) that stores variables, and an electrically erasable programmable read-only memory (EEPROM) that stores various parameters. The camera MPU 6 executes the program stored in the ROM to realize operations of the camera body 201 including focus detection processing described below.

The camera MPU 6 acquires luminance information of an object from a photometric/object feature information detection unit 10, and executes focus detection by a focus detection unit 7. According to the present exemplary embodiment, the photometric/object feature information detection unit 10 has a function of detecting feature information such as a face or a color of an object. For an area corresponding to color information detected by the photometric/object feature information detection unit 10, the camera MPU 6 calculates a defocus amount by driving the focus detection unit 7.

Figure 3A:
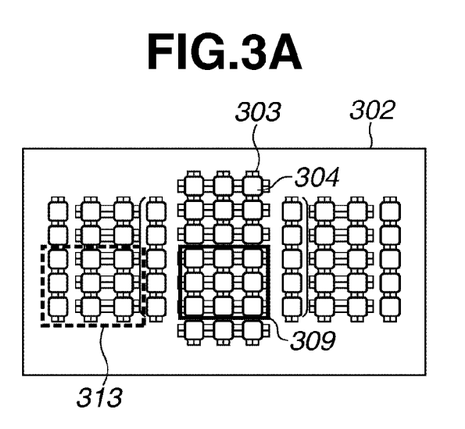
FIGS. 3A to 3F illustrate correspondence between an autofocus (AF) sensor surface and an autoexposure (AE) sensor surface according to the first exemplary embodiment.
Figure 3B:
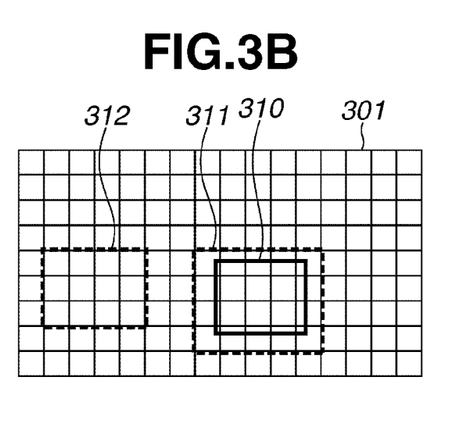

FIGS. 3A to 3F illustrate correspondence between an AF sensor surface and an AE sensor surface according to the present exemplary embodiment. FIG. 3B illustrates the AE sensor surface. According to the present exemplary embodiment, an AE sensor 211 included in the photometric/object feature information detection unit 10 includes a plurality of pixels 301 for detecting red, green, and blue (RGB) components illustrated in FIG. 3B. FIG. 3A illustrates an AF sensor surface 302. An AF sensor (signal generation unit) included in the focus detection unit 7 includes a plurality of line sensor pairs 303 and range-finding points 304 illustrated in FIG. 3A. Each line sensor includes a plurality of pixels.

The focus detection unit 7 executes AF control based on a phase difference between a pair of image signals output from the line sensor pair 303 corresponding to the respective range-finding points 304. In other words, the focus detection unit 7 executes the AF control by detecting a relative position shifting amount in a division direction of a light flux from the object. All the areas of the plurality of pixels 301 in the AF sensor 211 are set in a positional relationship corresponding to the AF sensor surface 302.

In place of the AF sensor of the exemplary embodiment, imaging plane phase difference AF can be performed in which focus detection by a phase difference method is executed using an output from a pixel on an image sensor. More specifically, there is a method for using an output from an AF pixel, which receives a light flux in which a part of an exit pupil of a photographic optical system is shielded. There is also a method for dividing a pixel below one microlens and using an output from each divided pixel. In addition, the phase difference AF using the AF sensor and the imaging plane phase difference AF can be combined.

The focus detection unit 7 designates maximum permissible storage time to the AF sensor. When the maximum permissible storage time has elapsed, or sufficient charges of the AF sensor have been stored, the focus detection unit 7 notifies the camera MPU 6 of reading completion. For example, when it is determined that the sufficient charges are stored in the center AF sensor, reading of other AF sensors can also be completed. For an operation of the focus detection unit 7, a technique concerning a known phase difference AF sensor is employed. As a camera lens system, the camera MPU 6 executes AF control by repeating data exchange communication with the lens, AF processing, and lens driving communication.

A shutter driving unit 8 drives a shutter (not illustrated) according to an instruction from the camera MPU 6. A dial unit 9 is an operation unit that enables a user to perform various settings, such as a continuous shooting speed, a shutter speed, an aperture value, and an imaging mode on the camera body 201. An imaging plane 11 is a light receiving surface of an image sensor 208 and receives an object image when a main mirror (and a sub-mirror) is moved out of an optical path to open the shutter. A display unit 12 includes a display apparatus, such as a liquid crystal display (LCD) or an organic electroluminescent (EL) display, and executes review display of an image captured by the imaging plane or graphical user interface (GUI) display, such as a menu screen.

Next, referring to a configuration diagram in FIG. 2, a function of the imaging apparatus according to the present exemplary embodiment will be described. An operation detection unit 213 detects an operation executed by the user via the dial unit 9 or a button, a switch, or a connection device (not illustrated) attached to the camera body 201, and transmits a signal according to the operation content to a system control unit 203 in the camera MPU 6. A mirror control unit 212 executes mirror control based on a control signal transmitted from the system control unit 203.

The system control unit 203 reads charge storage data from the line sensor pair 303 included in the AF processing unit 205 of the focus detection unit 7 when the operation detection unit 213 detects a switch (SW) operation or in a mirror-down state during continuous shooting. The system control unit 203 executes, based on the read data, selection of a range-finding point for focus adjustment and focus adjustment calculation. Then, the system control unit 203 transmits a lens driving signal based on the calculation result to the lens driving unit 221 via the lens MPU. The lens driving unit 221 moves the lens based on the signal transmitted from the system control unit 203 to execute focusing control.

The image sensor 208 photoelectrically converts a light flux entered via the lens into an electric signal to generate image data. The display control unit 209 causes the display unit 12 to display an image of an imaging result. A main memory 210 is a storage device for storing data necessary for calculation executed by the system control unit 203 and an AE image processing unit 204.

The AE image processing unit 204 performs various control operations based on the image data read out from the AE sensor 211. An AE sensor surface has a multi-division sensor structure such as that of the pixel 301 illustrated in FIG. 3B. The AE sensor includes R, G, and B filters and can detect face or color information as object feature information. A detection result of the face or color information of the object is transmitted to the AF processing unit 205 for each photographing operation. For example, the detection result of the face information can be transmitted once for several photographing operations, and the detection result of the color information can be transmitted to the AF processing unit 205 for each individual photographing operation. One of other processes performed by the AE image processing unit 204 is automatic exposure calculation, and exposure calculation processing is performed based on an output result of the AE sensor 211. According to the present exemplary embodiment, the system control unit 203 switches control of the AF processing unit 205 according to the detection result and the detection area of the face or color information of the object. The processing will be described in detail below.

Next, referring to FIGS. 3A to 3F, the AF sensor surface and the AE sensor surface of the present exemplary embodiment will be described. The focus detection unit 7 includes the AF sensor surface 302 including a plurality of line sensor pairs 303. On the AF sensor surface 302, a plurality of range-finding points 304 is disposed to be selectable by the user. In each range-finding point, a corresponding AF line sensor 303 is disposed. FIG. 3A illustrates an example where 61 selectable range-finding points are arranged. At the range-finding point 304, a pair of line sensors respectively for vertical detection and horizontal detection is disposed.

The photometric/object feature information detection unit 10 includes an AE sensor surface. As illustrated in FIG. 3B, the AE sensor surface is divided into pixels 301 as a plurality of photometric areas, and photometric processing can be performed on an area corresponding to a range-finding point of the AF sensor.

Figure 3C:
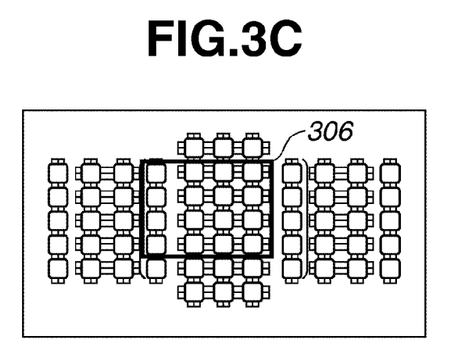
Figure 3D:
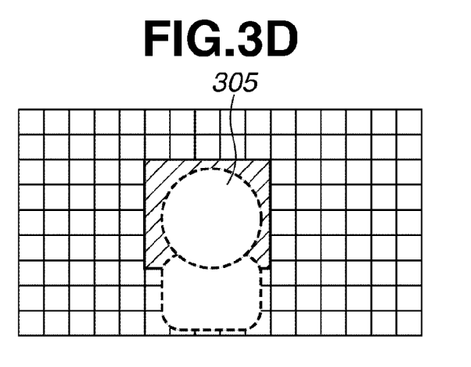

For example, FIGS. 3C and 3D illustrate a positional relationship between a detection state of the AE sensor surface (illustrated in FIG. 3D) and the AF sensor surface (illustrated in FIG. 3C) when an object (person) 305 is detected on the AE sensor surface. Upon detecting a position or a size of a face of the object 305 on the AE sensor surface, the photometric/object feature information detection unit 10 notifies the system control unit 203 of detected information. The system control unit 203 generates, based on the received information, range-finding point information on the AF sensor surface 302 corresponding to an area of the detected face. In the illustrated case, an area 306 is a range-finding point area.

Figure 3E:
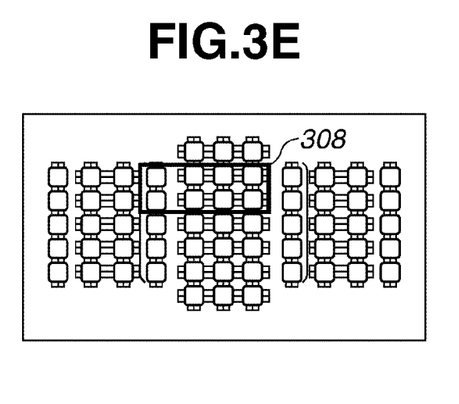
Figure 3F:
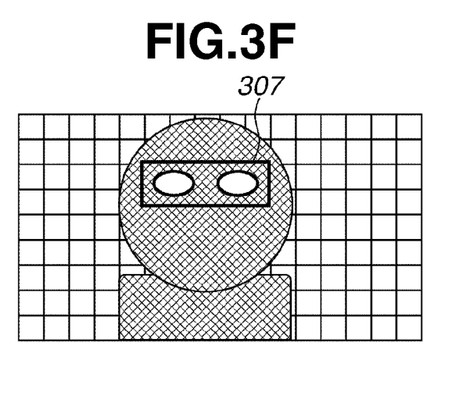

FIGS. 3E and 3F illustrate a positional relationship between a detection state of the AE sensor surface (illustrated in FIG. 3F) and the AF sensor (illustrated in FIG. 3E) when a relatively large object (person) is detected. In this case, the photometric/object feature information detection unit 10 detects an area 307 corresponding to eyes of the person. The system control unit 203 identifies an area 308 as a range-finding point area on the AF sensor surface 302 corresponding to an area of the eyes.

Next, referring to FIGS. 4 to 6, an AF processing flow executed by the AE image processing unit 204 and the AF processing unit 205 according to the present exemplary embodiment will be described.

Figure 4:
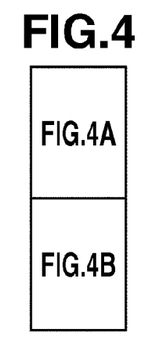
FIG. 4 (including FIGS. 4A and 4B) is a flowchart illustrating processing performed by an AF processing unit according to the first exemplary embodiment.
Figure 4A:
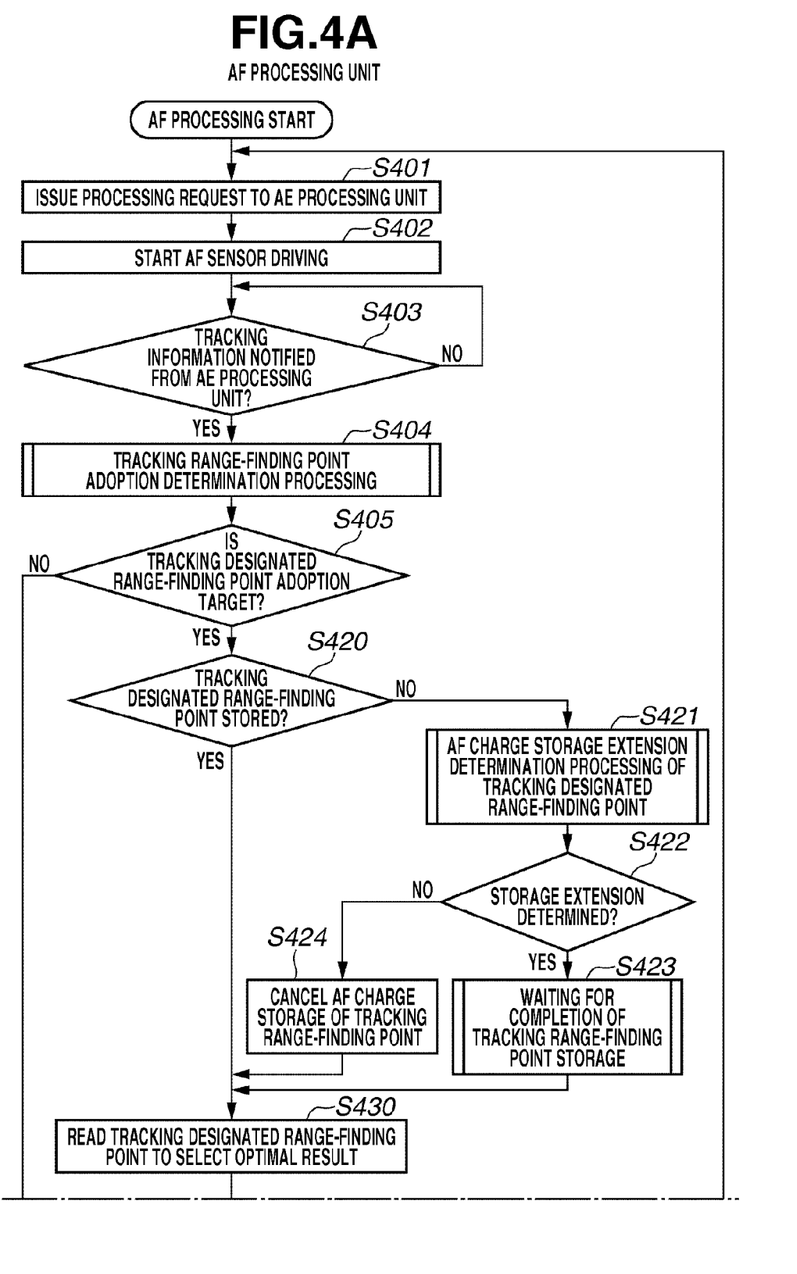
Figure 4B:
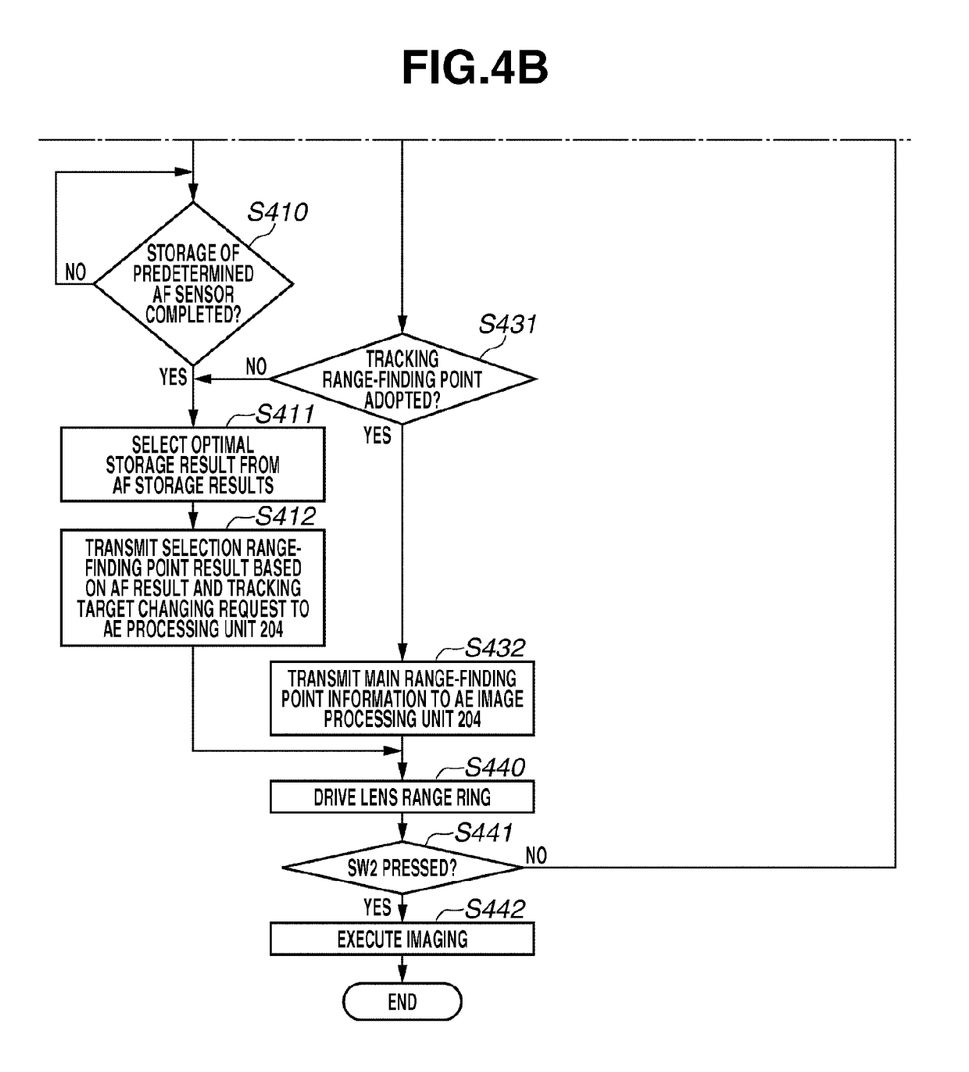

FIG. 4 (including FIGS. 4A and 4B) illustrates a control flow of the AF processing unit 205. When an input of a switch (SW) 1 is receives by the operation detection unit 213, the system control unit 203 controls the AF processing unit 205 to start AF processing. In step S401, the AF processing unit 205 makes a request to the AE image processing unit 204 for performing various types of processing such as object detection, photometric calculation, and the like.

In step S402, the AF processing unit 205 starts charge storage driving of the AF sensor. In step S403, the AF processing unit 205 waits for notification from the AE image processing unit 204 of information of an object to be tracked. Tracking processing executed by the AE image processing unit 204 will be described below referring to FIG. 5. The AF processing unit 205 acquires, as information of the tracked object, an evaluation value of reliability indicating certainty of a detection result of the tracked object and positional information of the object on the AF sensor surface.

In step S404, the AF processing unit 205 determines whether to adopt a tracking result notified from the AE image processing unit 204. The determination processing will be described below referring to FIG. 6. In step S405, the AF processing unit 205 refers to the determination result in step S404. If the AF processing unit 205 determines that the tracking result is not adopted (NO in step S405), the processing proceeds to step S410. If the AF processing unit 205 determines to adopt the tracking result (YES in step S404), the processing proceeds to step S420.

In step S410, the AF processing unit waits for completion of charge storage of a predetermined line sensor pair (e.g., center line sensor pair). Then, the AF processing unit 205 executes reading for a line sensor pair with respect to a range-finding point selected by the user via the operation detection unit 213 and its surrounding range-finding points. The execution of reading around the selected range-finding point is for capturing movement of the object in a horizontal or vertical direction to the sensor surface to focus the camera. It is desirable to read sensor information within a range as wide as possible as long as processing time permits. Further, in an automatic selection mode for automatically selecting an appropriate range-finding point from all the range-finding points, information is read from line sensor pairs corresponding to all the range-finding points.

In step S411, the AF processing unit 205 selects an optimal charge storage result from among charge storage results of the line sensor pair read in step 410. More specifically, a charge storage result where reliability of phase difference AF (reliability of image signal) is higher than a predetermined threshold value is employed. The reliability of the phase difference AF is calculated from a degree of coincidence between two images, for example, as discussed in Japanese Patent Application Laid-Open No. 2007-052072. Alternatively, when focus detection is performed in a prediction mode, the AF processing unit 205 selects, from past history, a sensor output result indicating an image deviation amount close to a prediction result as an optimal charge storage result.

In step S412, the AF processing unit 205 notifies the AE image processing unit 204 of position information of the range-finding point corresponding to the sensor position selected in step S411 and a request for updating a tracking target. For example, when an area 309 has been selected as a range-finding point area illustrated in FIG. 3A, the AF processing unit 205 notifies the AE image processing unit 204 of an area 310 illustrated in FIG. 3B corresponding to the area 309 on the AF sensor surface.

Processing in step S420 is performed when the tracking result notified from the AE image processing unit 204 is employed. The AF processing unit 205 determines whether charges have been stored in a line sensor pair (first signal generation unit) corresponding to the notified tracking range-finding point at the time when charge storage is completed for a predetermined line sensor pair (e.g., center line sensor pair).

There may be a plurality of range-finding points notified from the AE image processing unit 204. In this case, all line sensor pairs corresponding to the plurality of range-finding points are targets for determining completion of charge storage. When charge storage has been completed for a certain target line sensor pair (YES in step S420), in step S430, the AF processing unit 205 executes reading for the line sensor pair corresponding to the tracking designated range-finding point.

For example, when the AE image processing unit 204 detects presence of a tracking target in an area 312 illustrated in FIG. 3B, the AF processing unit 205 is notified of a corresponding area 313 on the AF sensor surface 302 illustrated in FIG. 3A. In this step, the AF processing unit 205 determines whether charge storage has been completed for all line sensor pairs corresponding to the area 313.

However, since the AE image processing unit 204 detects objects of same colors as described below, as an object feature of the notified area 313, a contrast component of a uniform color tends to be small. Thus, charge storage relatively takes time for a line sensor pair targeted for detecting a contrast component. In step S430, reading of the line sensor pairs corresponding to the tracking designated range-finding point is executed. The AF processing unit 205 selects an optimal reading result of the line sensor pair from among the reading results of the line sensor pairs.

The processing in step S421 is performed when charge storage is yet to be completed for the line sensor pair corresponding to the range-finding point notified from the AE image processing unit 204 in step S420. In this step, the AF processing unit 205 determines whether to extend the charge storage time of the sensor. In an embodiment of the present invention, the charge storage time is equivalent to the charge accumulation period. The determination processing will be described in detail below.

In step S422, the AF processing unit 205 refers to a determination result as to whether to extend the charge storage time of the line sensor pair corresponding to the tracking range-finding point executed in step S421. When the AF processing unit 205 determines not to extend the charge storage time (NO in step S422), in step S424, the AF processing unit 205 cancels the charge storage of the AF sensor of the tracking range-finding point. Then, in step S430, the AF processing unit 205 executes reading processing of the tracking range-finding point and selects an optimal charge storage result. When the AF processing unit 205 determines to extend the charge storage time (YES in step S422), in step S423, the AF processing unit 205 waits for completion of the charge storage of the AF sensor. Then, in step S430, the AF processing unit 205 executes reading processing of the tracking range-finding point and selects an optimal charge storage result.

In step S431, the AF processing unit 205 refers to a range-finding result of the tracking range-finding point selected in step S430 to determine whether to adopt the tracking range-finding point. For example, when a defocus amount as a range-finding result is greatly deviated compared with past range-finding history, it is determined that the tracking range-finding point is not adopted (NO in step S431), and the processing proceeds to step S411. When adoption of the range-finding point is determined (YES in step S431), the processing proceeds to step S432. In step S432, the AF processing unit 205 notifies the AE image processing unit 204 of, among the range-finding points notified from the AE image processing unit 204, the range-finding point finally selected in step S430, and the processing proceeds to step S440. The processing performed by the AE image processing unit 204 will be described below. Based on the range-finding point information, the AF processing unit 205 executes next tracking processing.

In step S440, the system control unit 203 instructs the lens MPU to drive a range ring of the lens based on a defocus amount derived from the charge storage result selected in step S411 or S430. The lens driving unit 221 drives the range ring based on an instruction from the lens MPU.

In step S441, the system control unit 203 detects an input of an operation of a SW 2. Then in step S442, the system control unit 203 performs image capturing processing. If no operation input of the SW 2 is detected (NO in step S441), the processing returns the AF processing in step S401 again.

Next, referring to a flowchart in FIG. 6, the determination as to whether to adopt the tracking result notified from the AE processing unit 204 in step S404 in FIG. 4 will be described.

In step S601, the system control unit 203 determines whether a tracking target changing request has been notified in step S412 of last range-finding processing. When the tracking target changing request has been notified (YES instep S601), instep S603, the system control unit 203 determines not to adopt the tracking result. When it is determined that no tracking target changing request has been notified instep S412 of the last range-finding processing (NO in step S601), the processing proceeds to step S602.

In step S602, the system control unit 203 determines whether the tracking result notified from the AE image processing unit 204 is greatly deviated on the sensor surface from the past range-finding history. When it is greatly deviated (YES in step S602), a possibility that the tracking result concerns detection of another object different from the object to be tracked is high. Thus, the processing proceeds to step S603, and the system control unit 203 determines not to adopt the tracking result. In this case, a threshold value of deviation on the sensor surface between the past selected range-finding point and the range-finding point of the tracking result is determined based on, for example, an angle of view and an object distance. When none of the conditions is satisfied (NO in step S602), the processing proceeds to step S604, and the system control unit 203 determines to adopt the tracking result.

Next, referring to a flowchart in FIG. 5, control performed by the AE image processing unit 204 will be described. First, in step S501, the AE image processing unit 204 waits to receive a processing request from the AF processing unit 205. When the processing request is received (YES instep S501), the processing proceeds to step S502.

In step S502, the AE image processing unit 204 determines whether a tracking target changing request has been notified from the AF processing unit 205. In the case of first tracking processing, the AE image processing unit 204 determines that a tracking request has been received. When it is determined that the tracking target changing request has been notified (YES in step S502), the processing proceeds to step S503. In step S503, the AE image processing unit 204 sets an area for detecting face or color feature information of the object based on the range-finding point area selected by the AF processing unit 205 and notified in step S412.

When it is determined that no tracking target changing request has been notified (NO in step S502), the processing proceeds to step S504. The AE image processing unit 204 sets, based on an area set in a last tracking area, an area for detecting face or color feature information of the object from its surrounding area. The area for detecting the feature information of the object is set around the last tracking area for the purpose of capturing horizontal movement of the object on the sensor surface. It is desirable to read sensor information of a range as wide as possible as long as processing time permits.

In step S505, the AE image processing unit 204 starts charge storage driving of the AE sensor 211. In step S506, the AE image processing unit 204 reads a charge storage result of the AE sensor 211.

In step S507, the AE image processing unit 204 determines whether a face is present based on a reading result of the AE sensor 211 using a known face detection technique. If a face is detected (YES in step S507), the processing proceeds to step S508, and whereas if not (NO in step S507), the processing proceeds to step S510.

In step S508, the AE image processing unit 204 determines presence or absence of the tracking target changing request in step S502. If it is determined that the tracking target changing request has been made (YES in step S508), the processing proceeds to step S509. In step S509, the AE image processing unit 204 stores color information for color tracking. The color information is stored to be used for tracking by the color information of next frame and after. In this case, certainty of a face when the face is detected is calculated as tracking reliability.

If no face is detected (NO in step S507), in step S510, the AE image processing unit 204 determines whether tracking can be performed based on a color. In this case, the AE image processing unit 204 determines presence or absence of the tracking target changing request in step S502. When the tracking target changing request is present (YES in step S510), the processing proceeds to step S511. Whereas the tracking target changing request is not present (NO in step S510), the processing proceeds to step S512.

In step S511, the AE image processing unit 204 stores the color information of the object detected in the area set in step S503 as color information for tracking. The color information is stored to be used for tracking by the color information of next frame and after. This processing corresponds to first tracking processing after a start of the range-finding, or tracking processing of next range-finding where the AF processing unit 205 does not adopt the tracking result.

In this case, for example, when the area 309 is selected as a range-finding point area illustrated in FIG. 3A, the AF processing unit 205 notifies the AE image processing unit 204 of an area 310 corresponding to the area 309. The color information stored by the AE image processing unit 204 in this step is color information present in an AE division area 311 including the area 310. When a plurality of colors is present, the AE image processing unit 204 stores a color of a large total area as a tracking color, and simultaneously stores shapes and sizes of areas of the same color.

In step S512, the AE image processing unit 204 searches for an area coincident with the stored tracking color information in the detection target area set in step S504. In this case, the AE image processing unit 204 searches for an area where the color information of the detection target area and the stored tracking color information coincide with each other, and calculates a degree of the coincidence as an evaluation value for evaluating tracking reliability.

Figure 10A:
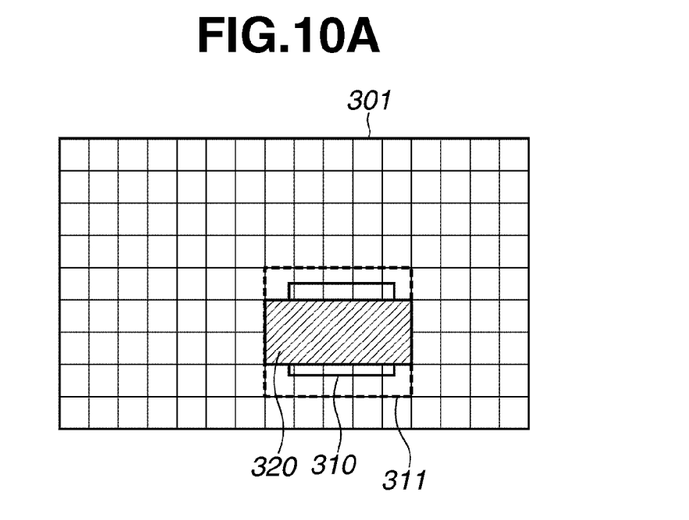
FIGS. 10A and 10B illustrate search for a tracking area on an AE sensor surface.

FIG. 10A illustrates a case where the AE image processing unit 204 is notified of the area 310 on the AE sensor corresponding to an AF selection range-finding point, for example, as described above in step S511. In FIG. 10A, the AE division area 311 including the area 310 is a detection target area. The AE image processing unit 204 cuts out a color area where a total area occupying areas determined as the same color in the AE division area 311 is largest. FIG. 10A illustrates a case where an area 320 indicated by diagonal lines in the AE division area 311 is determined as the largest area of the same color.

Figure 10B:
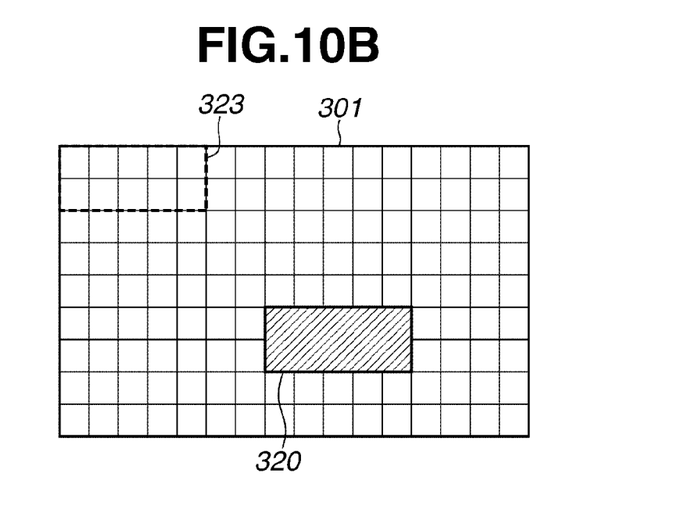

Then, in a next captured image, as illustrated in FIG. 10B, the AE image processing unit 204 regards the area 320 indicated by the diagonal lines as a reference area, and searches for an area whose color information coincides with the reference area as a tracking area. During detection of the tracking area, the reference area 320 is divided into a plurality of areas. In the case illustrated in FIG. 10B, the reference area 320 is divided into 10 areas.

The AE image processing unit 204 evaluates, for all the pixels 301 on the AF sensor, a degree of coincidence of the color information between each unit area 323 and the reference area 320. More specifically, the AE image processing unit 204 divides the unit area 323 as in the case of the reference area 320, and compares color components between each divided area of the reference area 320 and each divided area of the unit area 323. According to the present exemplary embodiment, a size of the unit area 323 is equal to that of the reference area 320, and the color components of the divided area in a corresponding position of both areas are compared with each other.

The AE image processing unit 204 calculates a result of adding together the degrees of coincidence of the color components of the respective divided areas of the unit area 323 and the reference area 320 for all the divided areas as an evaluation value of reliability, and sets a unit area 323 having a highest evaluation value as a tracking area. The degrees of coincidence of the color components are evaluated by this algorithm to set a tracking target, and a degree of coincidence of shapes is also evaluated as a result.

The AE image processing unit 204 lowers an evaluation value to reduce reliability when a newly set tracking area is deviated from the last determined tracking area on an x-y plane. This is in view of a high possibility that the object is present in a place nearer to the last detected tracking area.

Thus, the AE image processing unit 204 selects, from among the target areas, an area where color information best coincides with the tracking color information, and calculates a degree of coincidence as an evaluation value indicating reliability based on the stored shape and size of the object.

In step S513, the AE image processing unit 204 notifies the AF processing unit 205 of tracking information. As the tracking information, information as to whether a face has been detected in step S507, and pieces of information about the tracking range-finding area and reliability acquired in steps S511 and S512 are included.

Next, referring to FIG. 7, AF charge storage time extension determination processing of a tracking range-finding point according to the first exemplary embodiment will be described. In step S421 illustrated in FIG. 4, when charge storage is yet to be completed for the line sensor pair corresponding to the range-finding point notified from the AE image processing unit 204, the AF processing unit 205 determines whether to extend charge storage time of the sensor pair.

Figure 5:
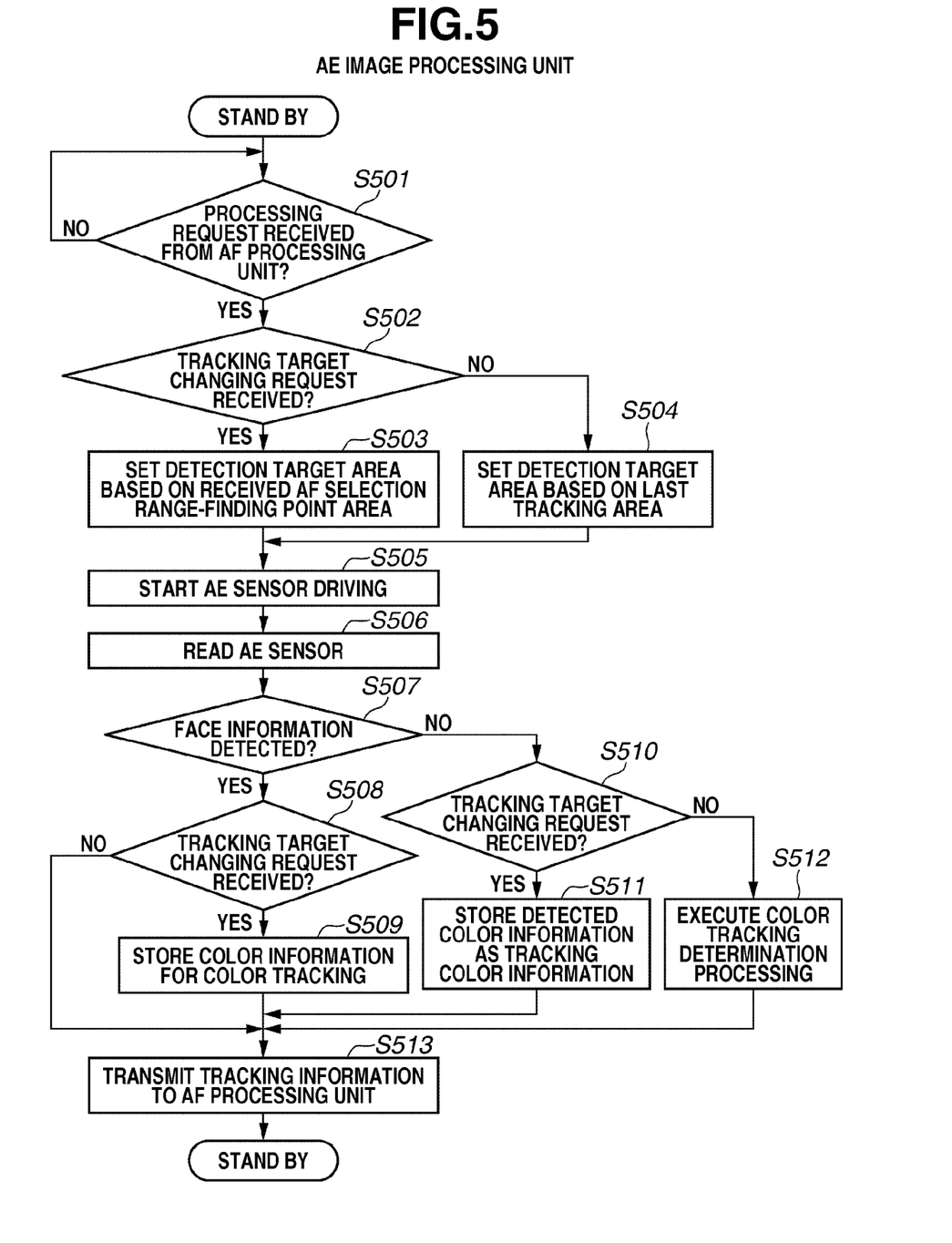
FIG. 5 is a flowchart illustrating processing performed by an AE image processing unit according to the first exemplary embodiment.
Figure 6:
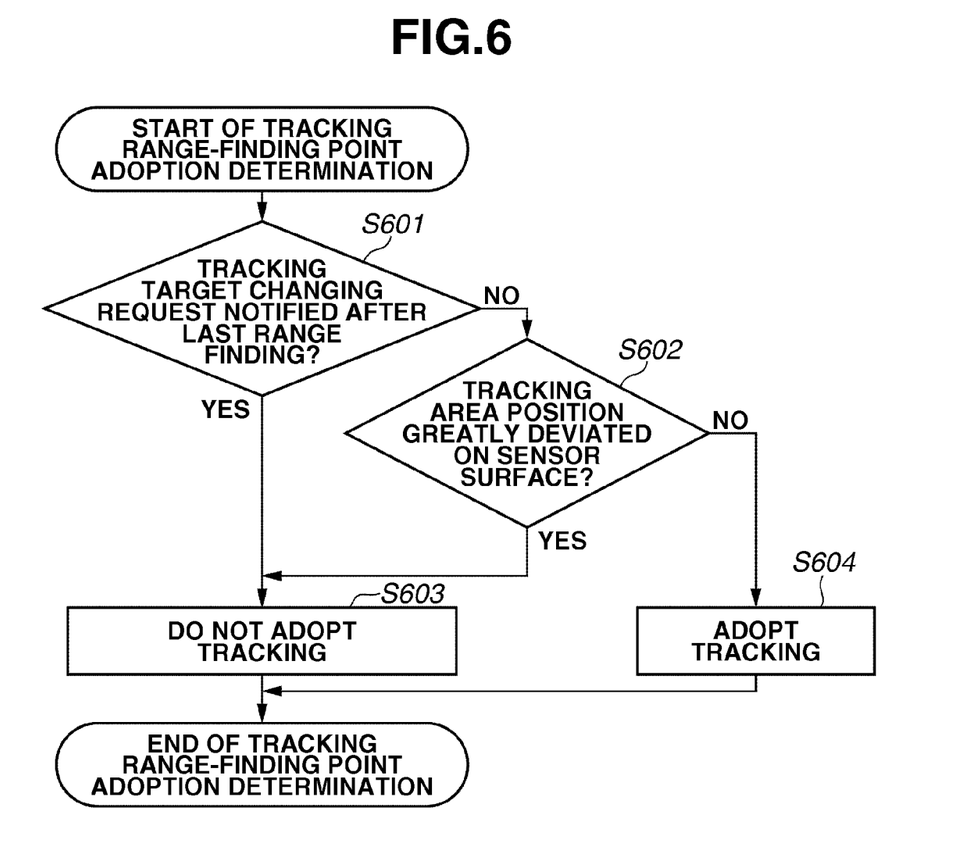
FIG. 6 is a flowchart illustrating tracking range-finding point adoption determination processing according to the first exemplary embodiment.
Figure 7:
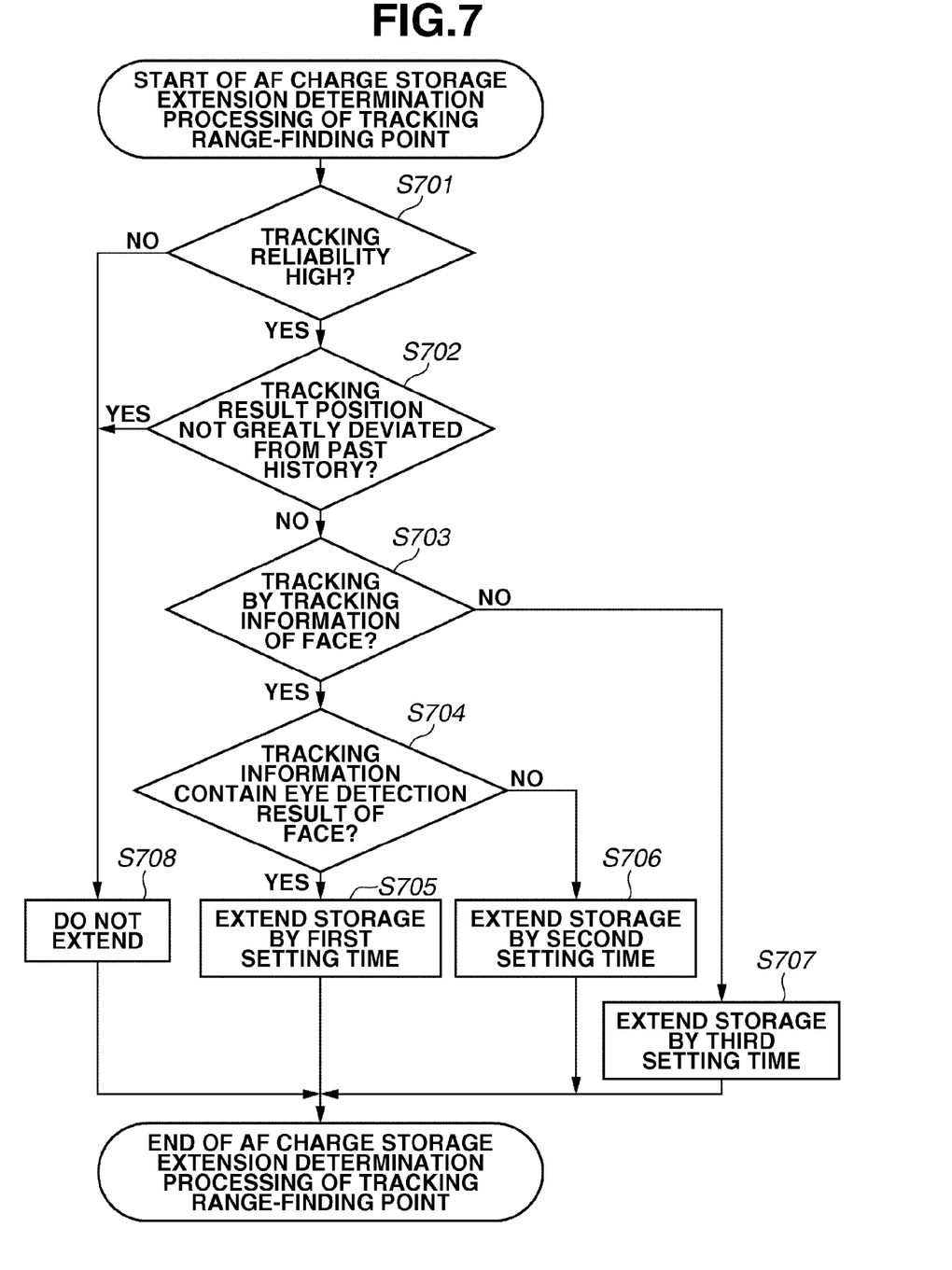
FIG. 7 is a flowchart illustrating AF charge storage extension determination processing of a tracking range-finding point according to the first exemplary embodiment.

In step S701 illustrated in FIG. 7, the AF processing unit 205 determines whether the tracking reliability notified from the AE image processing unit 204 in step S513 illustrated in FIG. 5 is sufficiently high. In other words, the AF processing unit 205 determines whether the tracking reliability is higher than a predetermined level. When the reliability is not higher than the predetermined level (NO in step S701, i.e., a second level), the processing proceeds to step S708. In step S708, the AF processing unit 205 does not extend the charge storage time and adopts a superior result from focus detection results irrespective of notification results from the AE image processing unit 204.

When the tracking reliability is higher than the predetermined level (YES in step S701, i.e., a first level), the processing proceeds to step S702. In step S702, the AF processing unit 205 determines whether newly acquired tracking positional information is not greatly deviated from the past history. For example, the AF processing unit 205 refers to past photographing history of several frames and, and even if a past tracking position is near the area 309 illustrated in FIG. 3A, but the newly acquired tracking position is greatly deviated as in the case of the area 313 in FIG. 3A (YES in step S702), the processing proceeds to step S708. If the newly acquired tracking position is not greatly deviated from the past history, the processing proceeds to step S703 (NO in step S702).

In step S708, the AF processing unit 205 adopts a superior result from the range-finding results without extending the charge storage time. A threshold value of deviation in this case is determined based on distance information of the object or a focal distance of the lens.

In step S703, the AF processing unit 205 determines whether the tracking result notified from the AE image processing unit 204 is acquired by tracking based on the face information. If the tracking result is based on the face information (YES in step S703), the processing proceeds to step S704. Whereas if the tracking result is based on not the face information but the color information (NO in step S703), the processing proceeds to step S707.

In step S704, the AF processing unit 205 determines whether an eye position has been detected in the face information of the tracking result notified from the AE image processing unit 204. When it is determined that the eye position has been detected (YES in step S704), the processing proceeds to step S705. In step S705, the AF processing unit 205 controls driving of the AF sensor using first setting time as extended storage time.

When it is determined that no eye position has been detected (NO instep S704), instep S706, the AF processing unit 205 controls driving of the AF sensor using second setting time as the extended storage time. In step S707, when the tracking result based on the color is detected, the AF processing unit 205 controls driving of the AF sensor using third setting time as the extended storage time. The first to third setting times can individually be set. For example, the setting times can be set to satisfy, the first setting time<the second setting time<the third setting. A reason for the settings is that when the eye position can be identified, a contrast component can be detected relatively easily.

When a face is identified, it is expected that a contrast component can be detected relatively easily compared with a case when a normal color is detected. Thus, when an eye or a face is detected, release responsiveness can be increased without setting the extended storage time more than necessary according to the object.

On the other hand, in the tracking based on color information, as described above in step S512, tracking reliability is determined to be higher as shapes or sizes are more similar with the same color. Accordingly, when tracking is performed based on the color information, detection of a contrast component tends to be difficult in the AF processing, and it is therefore desirable to secure longer charge storage time. In this case, tracking reliability and detection accuracy of phase difference AF are set in inverse correlation. Thus, the third setting time can be set by a reciprocal of an evaluation value indicating the tracking reliability.

According to the present exemplary embodiment, the maximum permissible storage time of the AF sensor is set beforehand. To extend the charge storage time, extended storage time is set so that total charge storage time can be within the maximum permissible storage time.

When the tracking reliability is higher than a predetermined level, the charge storage time can be extended by predetermined time, and when the tracking reliability is not higher than the predetermined level, the charge storage time may not be extended. Further, in the case to set the camera to more actively execute face detection, the first setting time and the second setting time can be set longer.

As described above, in the present exemplary embodiment, when the phase difference AF is performed corresponding to the area where the tracking based on the face or the color information has been executed, the extended storage time of the AF sensor is set according to a feature of the object. Such control enables securing of range-finding accuracy of the phase difference AF while securing tracking performance.

Figure 9:
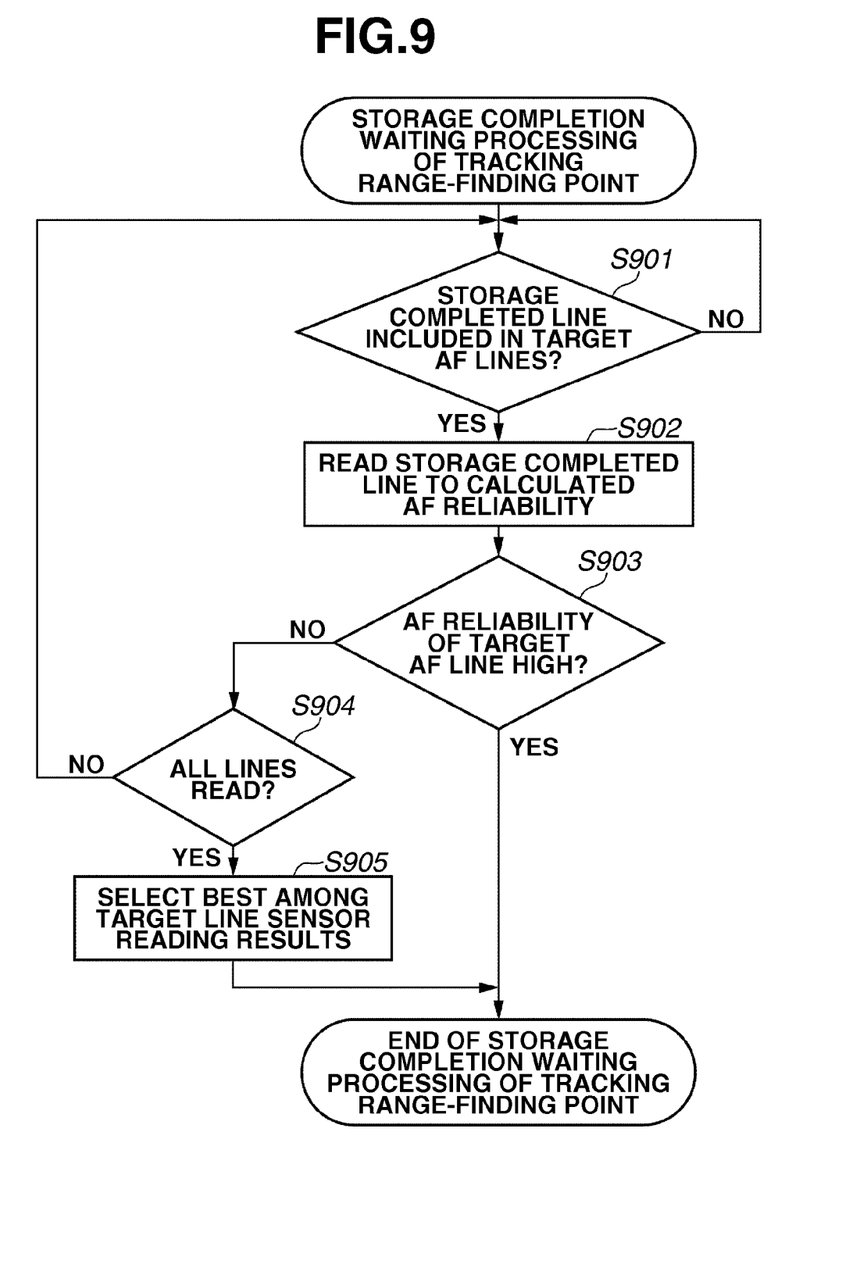
FIG. 9 is a flowchart illustrating AF charge storage completion waiting processing of a tracking range-finding point.

Next, referring to FIG. 9, processing for waiting for completion of the AF charge storage when the charge storage time is extended in step S423 illustrated in FIG. 4 will be described.

In step S901, the AF processing unit 205 waits for completion of charge storage for one of the plurality of line sensor pairs corresponding to the tracking area notified from the AE image processing unit 204.

In step S902, the AF processing unit 205 executes reading and calculation processing for the charge storage completed line sensor pair, and acquires reliability of the phase difference AF as in the case in step S411.

In step S903, the AF processing unit 205 determines whether the reliability acquired in step S902 exceeds a predetermined threshold value. When a charge storage result of any one of the line sensor pairs is sufficiently reliable (the reliability exceeds the predetermined threshold value, YES in step S903), the AF processing unit 205 cancels driving of the other line sensor pairs to end the current processing.

In other words, even when the charge storage time of the line sensor pair corresponding to the tracking range-finding point is extended, the AF processing unit 205 ends the charge storage when the reliability of the charge storage result of any one of the line sensor pairs corresponding to the tracking range-finding points acquired within the extended charge storage time is high. When the reliability of the charge storage result of the read line sensor pair is not high (the reliability does not exceed the predetermined threshold value, NO in step S903), the processing proceeds to step S904.

In step S904, the AF processing unit 205 determines whether stored charges of the line sensor pairs corresponding to all the tracking range-finding points have been read. When there is still any line sensor pair to be read (NO in step S904), the processing returns to step S901. When reading of all the line sensor pairs has been completed (YES in step S904), the processing proceeds to step S905. The AF processing unit 205 selects the best one from among the read results.

Through the processing described above, responsiveness of the AF processing can be secured by efficiently executing reading from the line sensor pair corresponding to the tracking area while adopting the tracking result of the AE image processing unit 204.

Next, a second exemplary embodiment will be described. Description of parts similar to those of the first exemplary embodiment will be omitted. The second exemplary embodiment is different from the first exemplary embodiment in charge storage time extension determination processing of the line sensor pair corresponding to the tracking range-finding point described above referring to FIG. 7. Hereinafter, referring to FIG. 8, the charge storage time extension determination processing of a line sensor pair corresponding to a tracking range-finding point according to the second exemplary embodiment will be described.

In step S421 in FIG. 4, when the charge storage is yet to be completed for the line sensor pair corresponding to the range-finding point notified from the AE image processing unit 204, the AF processing unit 205 determines whether to extend the charge storage time of the line sensor pair. In the second exemplary embodiment, by using the determination in step S421 as a reference, the AF processing unit 205 extends the charge storage time within a range where a continuous shooting speed set in the camera can be maintained. Accordingly, the AF processing unit 205 stores time of starting the AF processing in step S401.

Figure 8:
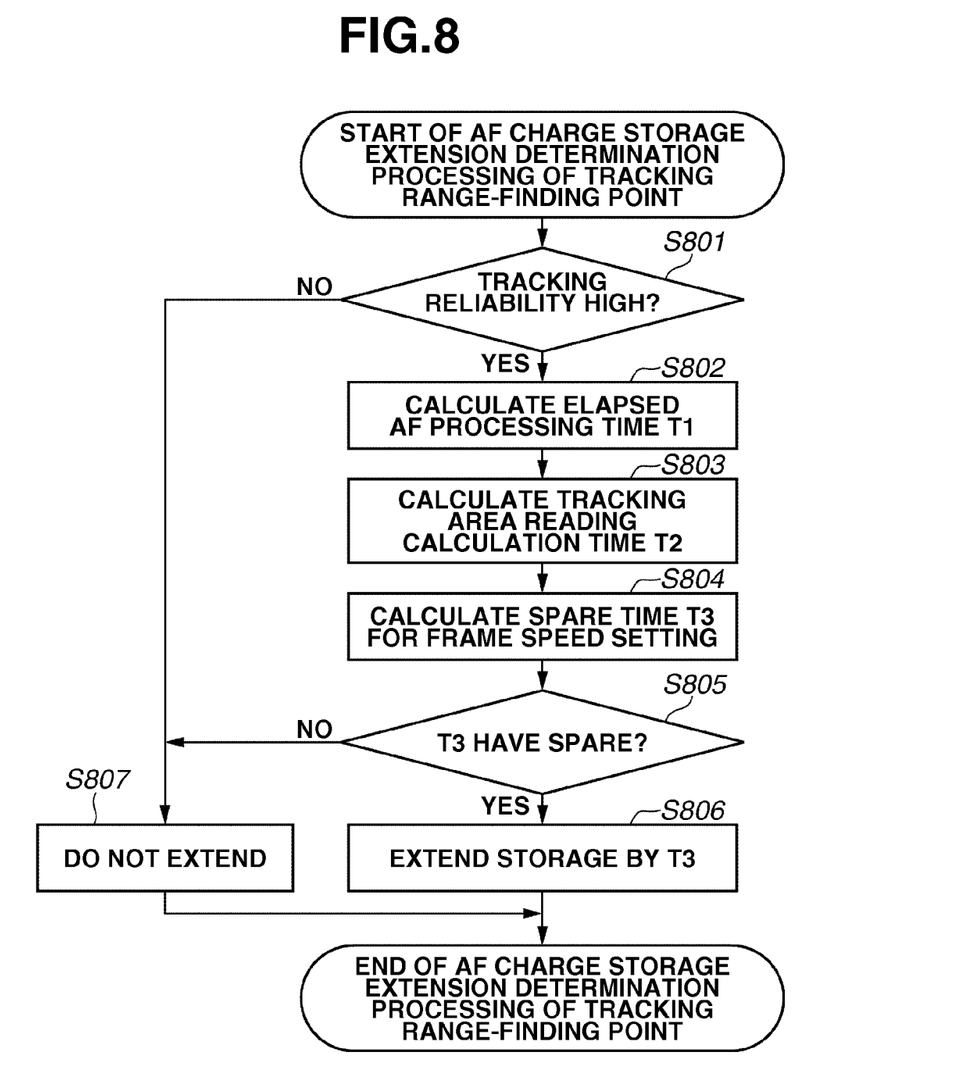
FIG. 8 is a flowchart illustrating AF charge storage extension determination processing of a tracking range-finding point according to a second exemplary embodiment.

In step S801, the AF processing unit 205 determines whether the tracking reliability notified from the AE image processing unit 204 in step S513 is sufficiently high. When the tracking reliability is low (NO in step S801), the processing proceeds to step S807, and the AF processing unit 205 selects a superior result from among the range-finding results without extending the charge storage time. Whereas, when the tracking reliability is high (YES in step S801), the processing proceeds to step S802.

In step S802, the AF processing unit 205 measures elapsed time T1 from the time stored in step S401 to step S421.

In step S803, the AF processing unit 205 calculates time T2 for reading/calculation for the line sensor pair corresponding to the tracking area notified from the AE image processing unit 204. Since the tracking area varies depending on detection results, the time T2 varies depending on the number of line sensor pairs included in the tracking area.

In step S804, the AF processing unit 205 calculates remaining time T3 excluding the processing time T1 and T2 with respect to a condition of the continuous shooting speed set in the camera. In step S805, the AF processing unit determines whether there is spare in the time T3 calculated in step S804. When it is determined that there is spare in the time T3 with respect to the set continuous shooting speed (YES in step S805), then in step S806, the AF processing unit 205 sets extended storage time for the time T3. On the other hand, when there is no spare in the time T3 (NO in step S805), in step S807, the AF processing unit 205 ends the processing without extending the storage time.

Through the processing described above, according to the present exemplary embodiment, even when a tracking result by the AE image processing unit 204 changes, the range-finding accuracy of the phase difference AF corresponding to the tracking area can be secured while maintaining the continuous shooting speed set in the camera and securing tracking performance.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-226993 filed Oct. 14, 2011 and No. 2012-156628 filed Jul. 12, 2012, which are hereby incorporated by reference herein in their entirety.

What is claimed is:

1. A focus adjustment apparatus comprising:
   an object detection unit configured to detect feature information of an object;
   a sensor unit provided with a plurality of sensor pairs each of which accumulates charges to generate a pair of image signals respectively; and
   a focus detection unit configured to control charge accumulation time of the plurality of sensor pairs and detect a focus based on a pair of image signals output from a first sensor pairs corresponding to the feature information of the object detected by the object detection unit,
   wherein in a first case if the reliability of the detection of the feature information of the object is a first level which is higher than a second level, a charge accumulation time of the first sensor pairs is a first amount of time;
   wherein in a second case if the reliability of the detection of the feature information is the second level, the charge accumulation time of the first sensor pairs is a second amount of time; and
   wherein the first amount of time is longer than the second amount of time.

2. The focus adjustment apparatus according to claim 1, wherein if the reliability of detection by the object detection unit is the second level, after an end of charge accumulation of a predetermined sensor pair, the focus detection unit ends the charge accumulation of the first sensor pair.

3. The focus adjustment apparatus according to claim 1, wherein the object detection unit tracks the object based on detected feature information.

4. The focus adjustment apparatus according to claim 3, wherein if the object detection unit does not track an object, the focus detection unit ends charge accumulation of other sensor pairs after an end of charge accumulation of a predetermined sensor pair.

5. The focus adjustment apparatus according to claim 1, wherein if there is a plurality of sensor pairs corresponding to the feature information of the object, the focus detection unit detects a focus based on a pair of image signals output from the sensor pair that corresponds to the feature information with the highest reliability.

6. The focus adjustment apparatus according to claim 1, wherein if the reliability of the detection by the object detection unit is the first level and if reliability of the image signals output from the first sensor pairs is higher than a predetermined threshold value within the set charge accumulation time, the focus detection unit ends the charge accumulation of the first sensor pair.

7. The focus adjustment apparatus according to claim 1, wherein the focus adjustment apparatus is configured to be included in an imaging apparatus, and
   wherein the charge accumulation time is set according to a continuous shooting speed of the imaging apparatus.

8. The focus adjustment apparatus according to claim 1, wherein the object detection unit detects color information as the feature information of the object.

9. The focus adjustment apparatus according to claim 1, wherein the object detection unit detects face information as the feature information of the object.

10. The focus adjustment apparatus according to claim 9, wherein if face information is detected as the feature information of the object, the focus detection unit sets the charge accumulation time to be shorter than that when no face information is detected as the feature information of the object.

11. The focus adjustment apparatus according to claim 9, wherein if the face information is detected as the feature information of the object, the object detection unit further detects eye information, and
   wherein if the eye information is detected, the focus detection unit sets the charge accumulation time of the first sensor pairs to be shorter than that when no eye information is detected.

12. The focus adjustment apparatus according to claim 1, wherein the sensor pairs are line sensors each including a plurality of pixels.

13. The focus adjustment apparatus according to claim 1, wherein the focus adjustment apparatus is configured to be included in an imaging apparatus including an image sensor configured to photoelectrically convert a light flux entered via a photographic optical system, and
   wherein the sensor pairs are pixels on the image sensor.

14. A method for controlling a focus adjustment apparatus including a sensor unit provided with a plurality of sensor pairs each of which accumulates charges to generate a pair of image signals respectively, the method comprising:
   detecting feature information of an object;
   controlling charge accumulation time of the plurality of sensor pairs; and detecting a focus based on a pair of image signals output from a first sensor pair corresponding to the feature information of the object, wherein in a first case if the reliability of the detection of the feature information of the object is a first level which is higher than a second level, a charge accumulation time of the first sensor pairs is a first amount of time;

wherein in a second case if the reliability of the detection of the feature information is the second level, the charge accumulation time of the first sensor pairs is a second amount of time; and wherein the first amount of time is longer than the second amount of time.

15. The focus adjustment apparatus according to claim 1, wherein the focus detection unit is configured to detect the focus based on the phase difference between each of the pair of image signals.

16. An imaging apparatus comprising:

an image sensor;

an object detection unit configured to detect feature information of an object and output an evaluation value of a reliability of the detection of the feature information of the object; and a focus detection unit configured to detect a focus based upon autofocus signals which represent the focus at a plurality of points which correspond to the feature information of the object;

wherein a charge accumulation time of a plurality of sensors used to generate the autofocus signals is increased above a default charge accumulation time if the reliability of the detection of the feature information of the object is above a threshold.

\* \* \* \* \*